United States Patent [19]

Niewold

[11] 4,411,581

[45] Oct. 25, 1983

[54] TRUCK AUGER-HOPPER CONSTRUCTIONS

[76] Inventor: Donald W. Niewold, 149 N. Market St., Paxton, Ill. 60957

[21] Appl. No.: 325,234

[22] Filed: Nov. 27, 1981

Related U.S. Application Data

[63] Continuation-in-part of Ser. No. 221,293, Dec. 30, 1980.

[51] Int. Cl.³ .............................. B60P 1/04; B60P 1/40
[52] U.S. Cl. ..................................... 414/489; 414/523; 414/526; 222/610; 222/626; 222/163; 222/381; 222/536
[58] Field of Search ......................... 222/526, 529–530, 222/536–537, 381, 320–321, 290, 163, 610, 622, 626–627; 414/489, 504–505, 523, 526; 198/671, 558, 555

[56] References Cited

U.S. PATENT DOCUMENTS

| | | | |
|---|---|---|---|
| 3,090,527 | 5/1963 | Rensch | 222/610 |
| 3,265,253 | 8/1966 | Niewold | 222/321 |
| 3,342,355 | 9/1967 | Lasiter | 414/526 X |
| 3,498,483 | 3/1970 | Meharry | 414/523 |
| 3,572,643 | 3/1971 | Birdsall | 414/526 X |
| 3,642,155 | 2/1972 | Carlson | 414/523 |
| 4,095,705 | 6/1978 | Hood | 414/526 X |

*Primary Examiner*—Charles A. Marmor
*Attorney, Agent, or Firm*—Lockwood, Dewey, Alex & Cummings

[57] ABSTRACT

Auger-hopper constructions for mounting to an inclinable body of a truck at the tailgate of the truck includes a pair of hoppers, one of which is stationarily and removably mounted to the truck, and the second of which is pivotally mounted to the first hopper adjacent an opening in the bottom of the first hopper. The second hopper also includes an opening adjacent its bottom at which an auger tube is swivelly mounted. The auger tube, by virtue of the pivotal and swivel mountings, is pivotable in a 90° arc in a plane perpendicular to the axis of the pivotal movement and is swivelable in a 180° arc in a plane which is parallel to the axis of the pivotal movement. Both the first and second hopper are dimensioned and positioned such that no portion of either of the hoppers extends substantially beneath a plane defined by the bottom of the inclinable body of the truck. The second hopper includes rigid side walls which extend toward the first hopper and, in one preferred embodiment, a rigid top wall is provided on the second hopper which overlies the first hopper and reinforces the second hopper.

46 Claims, 7 Drawing Figures

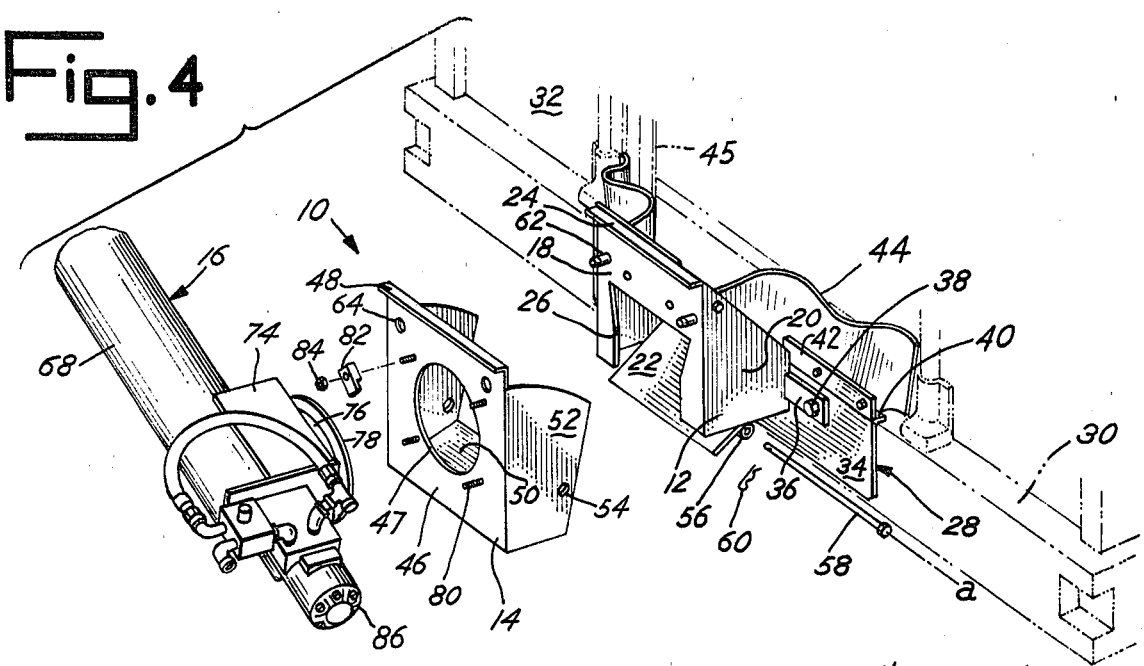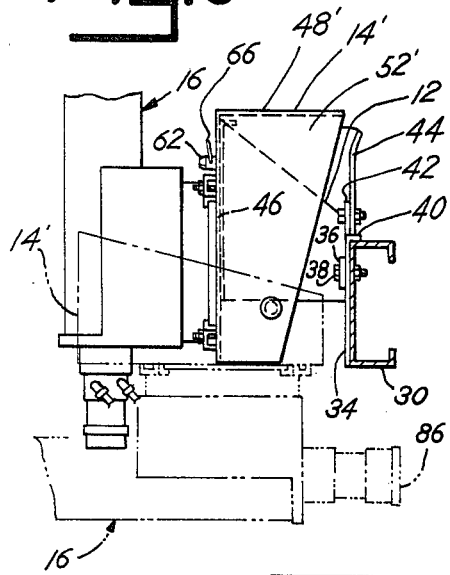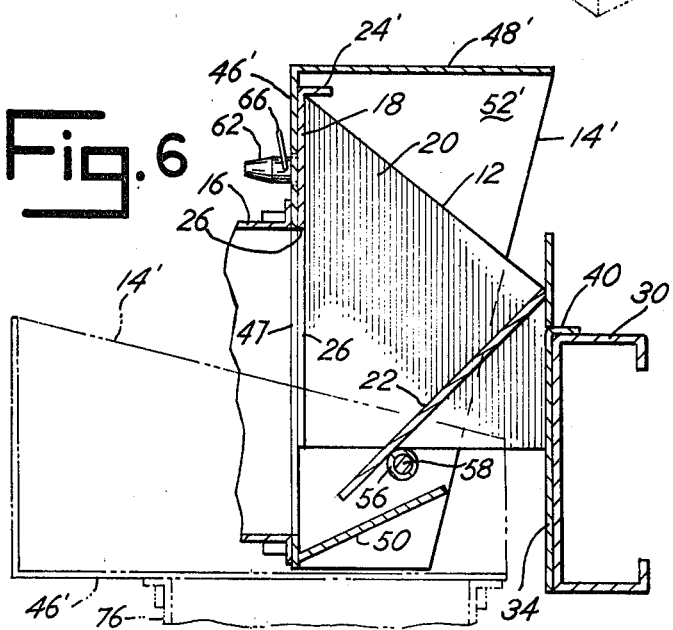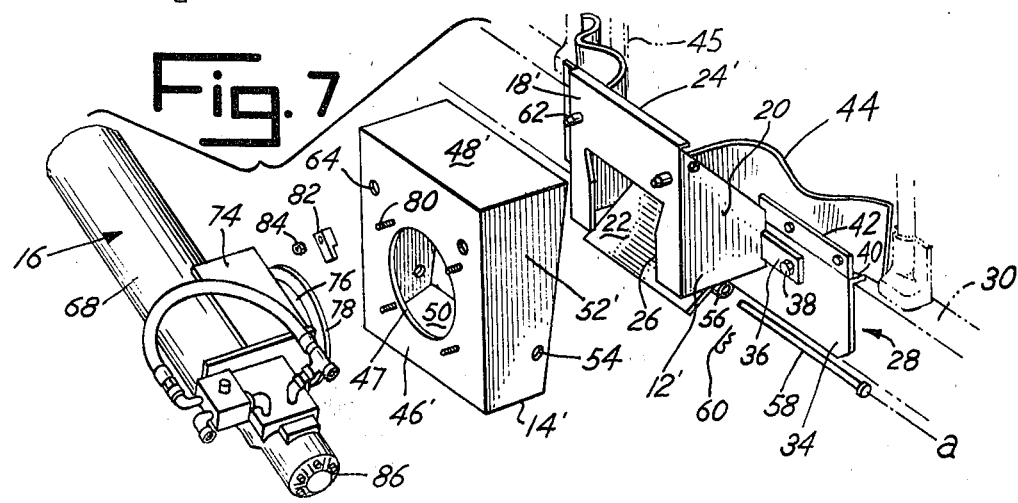

4,411,581

TRUCK AUGER-HOPPER CONSTRUCTIONS

RELATED APPLICATION

The present application is a continuation-in-part of my copending application, Ser. No. 221,293, filed Dec. 30, 1980.

BACKGROUND AND SUMMARY OF THE INVENTION

The present invention relates to auger-hopper constructions and, more particularly, to auger-hopper constructions for mounting at the tailgate of a truck.

Auger tubes for pumping feeds, fertilizer, grain and other free-flowing particulate or granular materials have been mounted to the tailgates of trucks in the past for feeding the material from the truck to some discharge point, such as a grain elevator, grain drill or the like. Such prior constructions either consisted of an auger tube rigidly mounted in the truck tailgate so that it was immobile relative to the tailgate or the auger tube was swivelly mounted directly on the tailgate so that it could only be moved in two degrees of freedom relative to the tailgate, i.e. a plane parallel to the plane of the tailgate. Because of the manner of mounting the auger tube in these prior constructions, the ability to position the discharge end of the auger tube was limited relative to the tailgate. It was either locked in relation to the tailgate or was limited to movement only in a plane parallel to the plane of the tailgate. Thus, in both of these prior auger-hopper constructions, the position of the auger discharge end was dependent upon the degree of inclination of the truck body and its tailgate and could not be readily adjusted to compensate for changes in the inclination or for different inclinations of the truck body.

In my U.S. Pat. No. 3,265,253, an auger-hopper construction is disclosed for use with a gravity flow wagon box in which the inclination of the auger tube and the position of the discharge end is capable of movement in three degrees of freedom to enable rapid and easy positioning of the discharge end of the auger tube in any one of a virtually infinite number of positions. However, the auger-hopper construction disclosed in that patent is constructed for mounting upon the discharge chute of a gravity flow wagon box. Such discharge chutes are fixed with respect to their inclination relative to the ground, unlike the tiltable body of a dump truck. Thus, the auger-hopper construction disclosed in that Letters Patent is not readily adaptable to a truck tailgate because the tiltable truck body may assume any one of a number of different inclinations during the course of loading, unlike the fixed gravity flow wagon box discharge chute. Such variability of inclination presents configuration, clearance and spillage problems which do not exist with the stationary discharge chute of a gravity flow wagon box.

In my aforementioned parent application of which this is a continuation-in-part, an auger-hopper construction is disclosed for mounting upon the rear or at the tailgate of an inclinable body dump truck and which overcomes a number of the disadvantages of the prior truck mounted auger systems as set forth in that application. The subject matter disclosed in that application is incorporated herein by reference.

The present invention enjoys all of the advantages enumerated in my prior parent application and also enjoys several additional important advantages. The auger-hopper constructions incorporating the principles of the present invention may be substantially reduced in weight, e.g. as much as 60% reduction in weight, over the construction disclosed in my prior application. In the auger-hopper constructions incorporating the principles of the present invention, any possible need for bracing of the hopper construction which may extend beneath the plane of the inclinable body of the truck is avoided because the auger-hopper construction essentially terminates at or above that plane. Thus, elimination of the need for bracking further reduces the weight of the construction, reduces the number of parts needed in the construction, and allows the body of the truck to be inclined to its full extent without interference from the auger-hopper construction. In the auger-hopper constructions incorporating the principles of the present invention, the width of the hoppers themselves may also be substantially reduced thereby allowing the constructions to be mounted on tailgates or tailgate openings having a wide variety of differing widths. The auger-hopper constructions incorporating the principles of the present invention, even though substantially lighter in weight, are actually strengthened because of their configuration because they may be of all-welded construction, and because the flexible hopper side walls as disclosed in my prior parent application may be eliminated. The reduction in weight and size of the auger-hopper constructions incorporating the principles of the present invention, not only results in a reduction in the cost of materials to make the constructions, but also facilitates packaging, shipping, handling, assembly and mounting or dismounting of the constructions. The auger-hopper constructions of the present invention substantially reduce the likelihood of spillage of the material being handled. Last but not least, the auger-hopper constructions of the present invention may be readily mounted to or dismounted from the truck and component parts may be easily and quickly mounted to or removed from other parts, and some of the component parts may actually be left on the truck.

In one principal aspect of the present invention, an auger-hopper construction for mounting to an inclinable body of a truck at the tailgate of a truck includes first hopper means having an opening adjacent the bottom thereof and first hopper mounting means for mounting the first hopper means in a position to receive material from the truck and such that no portion of the first hopper means extends substantially beneath a plane defined by the bottom of the inclinable body of the truck. A second hopper means, also having an opening therein, is pivotally mounted to the first hopper means to receive material from the opening in the first hopper means. The pivotal mounting means permits the second hopper means to pivot about an axis between pivot limits in which the second hopper means is substantially vertical or horizontal when the truck body is not inclined. The pivotal mounting means also mounts the second hopper such that it does not extend substantially beneath the plane defined by the bottom of the inclinable body of the truck when both hopper means are mounted to the truck. Auger tube means is also swivelly mounted to the second hopper means and overlies its opening to receive material from that opening. The pivotal mounting means and swivel mounting means cooperate to permit inclination of the auger tube means in a plane substantially perpendicular to the axis of pivotal movement and also in inclination in a plane substantially parallel to the axis of the pivotal movement at substantially all angles of inclination of the truck body.

In another principal aspect of the present invention, an auger-hopper construction for mounting to an inclinable body of a truck at the tailgate of the truck includes first hopper means having a rigid rear wall with an opening therein adjacent the bottom thereof and rigid side walls, and first hopper mounting means for mounting the first hopper means in a position to receive material from the truck. A second hopper means, also including a rigid rear wall having an opening therein and rigid side walls, is pivotally mounted to the first hopper means to receive material from the opening in the first hopper means. The pivotal mounting means permits the second hopper means to pivot about an axis between pivot limits in which the second hopper means is substantially vertical or horizontal when the truck body is not inclined, said first hopper means being nested in the second hopper means when the latter is pivoted to its vertical position. Auger tube means is also swively mounted to the second hopper means and overlies its opening to receive material from that opening. The pivotal mounting means and swivel mounting means cooperate to permit inclination of the auger tube means in a plane substantially perpendicular to the axis of pivotal movement and also in inclination in a plane substantially parallel to the axis of the pivotal movement at substantially all angles of inclination of the truck body.

In still another principal aspect of the present invention, one or either of the aforementioned second hopper means includes reinforcing means at its top which may either extend outwardly or inwardly toward the first hopper means in overlying relationship to the latter.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 4 is a partially broken, exploded perspective view of the tailgate of the truck and the embodiment of auger-hopper construction shown in FIGS. 2 and 3;

FIG. 5 is a partially broken, side elevational view of a second preferred embodiment of auger-hopper construction of the present invention;

FIG. 6 is an enlarged cross-sectioned, side elevational view of the auger-hopper construction as shown in FIG. 5; and FIG. 7 is a partially broken, exploded perspective view of the tailgate of the truck and the embodiment of auger-hopper construction shown in FIGS. 5 and 6.

DESCRIPTION OF THE PREFERRED EMBODIMENTS

Figure 1:
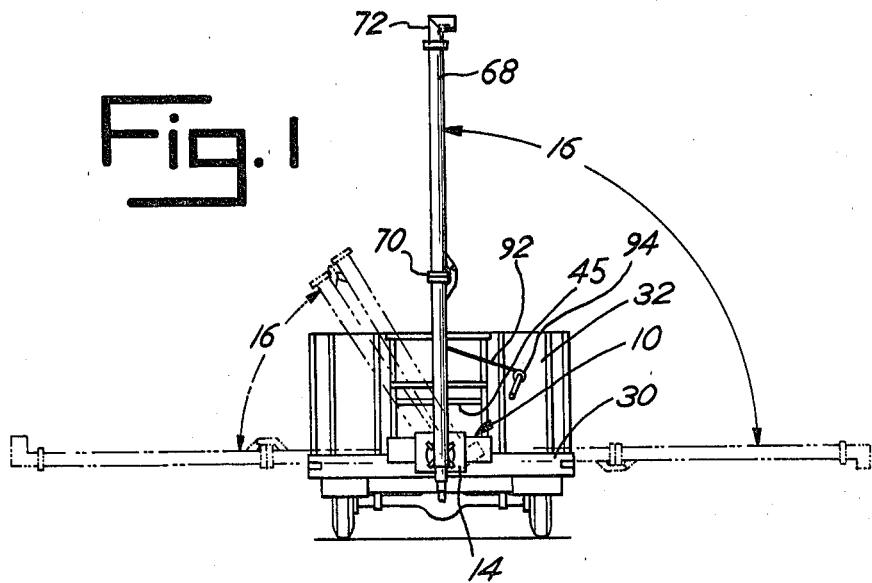
FIG. 1 is a rear elevational view of a truck upon which at least one preferred embodiment of auger-hopper construction in accordance with the principles of the present invention has been mounted.

In FIGS. 1-4, a first preferred embodiment of auger-hopper construction of the invention is shown generally by reference numeral 10. The construction includes three principal components: a first hopper 12, a second hopper 14 and auger tube 16.

Figure 3:
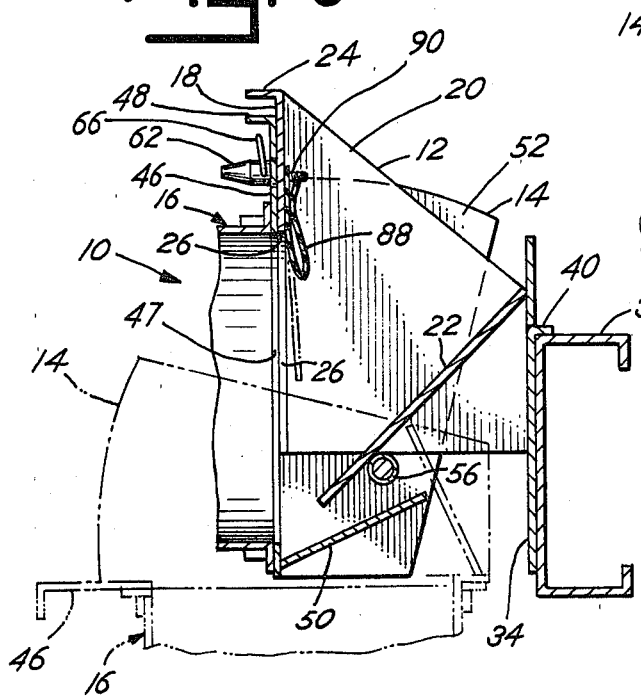
FIG. 3 is an enlarged cross-sectioned, side elevational view of the auger-hopper construction shown in FIG. 2.

The first hopper 12 preferably comprises a rear wall 18 as shown in FIGS. 3 and 4, a pair of spaced side walls 20 and an inclined bottom wall 22 so as to form an enclosure preferably no portion of which extends substantially beneath the plane defined by the truck body frame. The rear wall 18 preferably includes an outwardly extending flange 24 along its top as shown in FIGS. 3 and 4 to reinforce the hopper 18. An opening 26 is positioned at the bottom of the rear wall 18 and the inclined bottom wall 22 defines the bottom of the opening and directs the material which enters the hopper toward the opening 26.

Mounting means, generally 28 as shown in FIG. 4, is provided for removably mounting the hopper 12 to the frame, generally 30, of the truck adjacent the tailgate 32 of the truck in stationary fixed relationship to the tailgate. The mounting means preferably comprises a plate 34 which extends transversely of the frame, a pair of reinforcing arms 36 which are welded to the first hopper 12, and bolts 38 which rigidly bolt the arms 36 and plate 34 to the frame 30 of the truck. The use of plate 34 and bolts 38 enable the hopper 12 to be quickly and easily removed from the truck when it is not needed.

The top of plate 34 is preferably flanged at 40 so as to overlie the truck frame 30 and support the vertical component of the weight of the auger-hopper construction of the invention on the frame 30. Plate 34 also preferably extends further upwardly to form a second vertical flange 42. A flexible member 44 extends between the side walls 20 of hopper 12 to the edge of the opening 45 in the tailgate 32 of the truck. The flexible member 44 is attached to the side walls 20 and flange 42 by suitable bolts to rigidify the flexible member and hold it in place. Provision of the flexible member allows the width of the hopper 12 to be substantially reduced and, thereby, adapt the hopper 12 to mounting upon a wide variety of tailgates of differing widths and opening sizes and reduces the size and weight of the hopper. Flexible member 44 is adjustable in length depending upon the width of opening 45 in the tailgate 32 and channels the material from the truck tailgate opening 35 into the essentially open side of hopper 12 which faces the opening 35 and prevents spillage.

The second hopper 14 comprises a rear wall 46 also having opening 47 toward the bottom thereof in substantial alignment with opening 26 and an outwardly turned reinforcing flange 48 at its top, an inclined bottom wall 50 and a pair of rigid side walls 52 which together define an enclosure. The rear wall 46 has a width slightly greater than the width of the rear wall 18 of hopper 12 to allow the side walls of the second hopper 14 to fit over the side walls 20 of hopper 12 when the second hopper is in its full vertical position as shown in solid in FIG. 2. Thus, the first hopper 12 is actually nested in the second hopper 14 when the second hopper has been moved to its vertical position. The height of rear wall 46 is preferably somewhat shorter than the rear wall 18 to prevent interference by flange 24 of the first hopper 12 when the second hopper is moved to its full vertical position as is shown in solid in FIG. 3.

Each of the side walls 52 of the second hopper 14 includes an opening 54 as shown in FIG. 4 and a pivot tube 56 is fixed, as by welding, to the underside of the inclined bottom wall 22 of hopper 12 intermediate the top and bottom edges of bottom wall 22. The hopper 14 is mounted for pivotal movement to the hopper 12 by insertion of a pivot pin 58 through the openings 54 and tube 56 allowing the hopper to pivot between a vertical position as shown in solid in FIGS. 2 and 3 and a horizontal position as shown in dot-and-dash. The pivot tube 56 is positioned at a location on bottom wall 22 in spaced relation to the bottom of hopper 12 such that, upon pivoting, the lowest point of the second hopper does not extend substantially beneath the plane defined by the bottom of the truck body frame 30 as shown in FIG. 3. A cotter pin 60 or other suitable fixing means may be provided through the end of rod 58 to prevent inadvertent removal of the rod and hopper 14 during operation or transit. However, the cotter pin 60 may be quickly and easily removed to allow rapid removal of hopper 14 from hopper 12, if desired.

Studs 62 are also fixed, such as by welding, to the wall 18 of hopper 12 and extend in alignment with complementary openings 64 in wall 46 of hopper 14. Again, suitable cotter pins 66 as shown in FIGS. 2 and 3 may be provided with studs 62 to lock the wall 46 of hopper 14 in place in the vertical, such as when the auger tube 16 is folded in the transport position as shown in dot-and-dash in FIG. 1.

Figure 2:
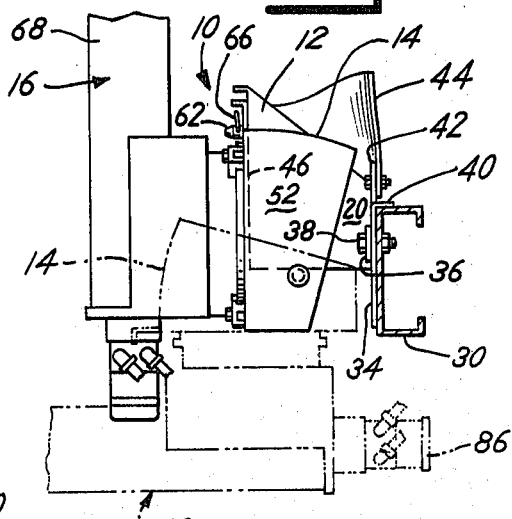
FIG. 2 is a partially broken, side elevational view of one preferred embodiment of auger-hopper construction of the present invention.

The auger tube 16 comprises an elongate cylinder 68 which may be of either one piece construction or of two or more pieces which are hinged at 70 for folding and storage as shown in FIG. 1. A suitable auger (not shown) is positioned in the cylinder 68 for moving materials from the bottom end of the cylinder toward its discharge end or head 72.

An elbow or receiving box 74 is positioned at the bottom end of the auger cylinder 68 and preferably includes a sleeve 76 having a circular flange 78 at its end. The flange 78 is adapted to be positioned flush against the face of wall 46 of hopper 14 about the perimeter of its opening and such that the perimeter of the flange lies within the confines of a plurality of studs 80 as shown in FIG. 4 which are fixed by suitable means, such as by welding, to the wall 46 of hopper 14. A plurality of lugs 82 are attached by nuts 84 to studs 80 in overlying relationship to flange 78 to hold the flange against the wall 46 of hopper 14, but allow the flange to swivelly rotate therebeneath to allow for a swivelling motion of the auger tube 16 in a plane parallel to wall 46 of hopper 14 and to the axis a as shown in FIG. 4 of the pivotal movement of hopper 14.

A suitable motor 86, which may be hydraulically driven from the truck, is also mounted on the bottom end of the auger tube 16 to drive the auger. The discharge head 72 is also preferably mounted for swivelling motion at the top of the auger cylinder 68 to allow the discharge of material to be directed in a specific direction relative to the auger cylinder 16.

In this embodiment, if necessary, it might be desirable to throttle the material passing from the opening 26 in hopper 12 when the truck body is fully inclined and the second hopper 14 has been pivoted substantially from the vertical position shown in solid in FIGS. 2 and 3 to prevent spillage over the top of the second hopper. In this condition, the materials are flowing at their maximum flow rate. Such throttling may be achieved, for example, by a flexible flap 88, as shown in FIG. 3, bolted to the interior of wall 18 by bolts 90. The flap 88 may be normally held up by jamming its lower edge under the bolts 90 as shown in FIG. 3, but may be dropped if desired to throttle the flow by restricting the size of opening as shown in dot-and-dash in FIG. 3.

The second embodiment shown in FIGS. 5-7 is substantially identical in a number of respects to the first embodiment just described. Like reference numerals have been employed to designate substantially like components and where a component has been somewhat modified over a similar component in the embodiment just described, the designation prime "'" will be employed in conjunction with the previously designated reference numerals.

In the embodiment shown in FIGS. 5-7, the top flange 48 shown in FIG. 4 has been reversed and enlarged to form a top wall 48' of hopper 14' and the side walls 52' of hopper 14' have been extended to meet and join the top wall 48'. In addition, wall 46' of hopper 14' has been lengthened somewhat so that it extends above the top of wall 18' of hopper 12'. Finally, reinforcing flange 24' has also been reversed to extend inwardly as shown in FIGS. 5-7 to allow hopper 14' to fully close to the vertical position as shown in solid in FIGS. 5 and 6.

By extending the top flange inwardly to form a top wall 48' and by joining the rigid wide walls 52' to the top wall 48', hopper 14' is further reinforced to support the weight of the relatively heavy auger tube 16. In addition, wall 48' also covers at least a portion of the open top of hopper 12' to, at least some extent, provide some measure of protection for the open top to keep out rain or debris. The enlarged top wall 48' also defines a more complete enclosure for housing 14' and prevents spillage during high flow conditions and allows elimination of the flap 88 as previously described.

From the above description, it will be seen that the auger tube 16 in both embodiments is capable of independent movement relative to the tailgate 32 of the truck so as to assume a virtually infinite number of different inclinations and may easily be adjusted in three degrees of freedom at will whenever the inclination of the truck body is changed or a change of discharge location is desired. The auger tube 16 may be moved between any one of a number of arcuate positions between vertically upward as shown in solid in FIGS. 2, 3, 5 and 6 to horizontally rearward in a plane perpendicular to the pivotal axis a by the pivotal movement of hopper 14 or 14' about pivot rod 58 as shown in dot-and-dash in those figures. Moreover, the auger tube 16 may also be simultaneously moved between any one of a plurality of positions between vertically upward as shown in solid in FIG. 1 or to the full horizontal right and left as shown in dot-and-dash in FIG. 1 over virtually a 180° arc in a plane parallel to the pivotal axis a by the swivelling of flange 78 relative to the wall 46 or 46' of hopper 14 or 14'. The auger tube 16 may also be folded for storage or transit as shown in dot-and-dash in FIG. 1. These latter movements are allowed by the swivelling motion at flange 78.

A positioning chain or cable 92 may be provided as shown in FIG. 1 coupled to the auger tube 16 and a hand-cranked or other form of winch 94 attached to the tailgate 32 of the truck for adjusting the inclination of the auger tube 16 and maintaining it in its desired inclination.

As previously mentioned, the auger-hopper construction just described enjoys all of the advantages previously set forth in my copending parent application as well as several additional advantages. By provision of the flexible members 44, the width of both hoppers 12 and 14 may be substantially reduced and they may be readily adapted to be mounted to tailgate openings of widely varying dimensions. Such width reduction not only results in a reduction of the cost of material necessary to build the construction, but also ease of handling, shipping, assembling and mounting or removal from the truck.

Another advantage of the present invention is that because the pivot axis a is selectively positioned intermediate the top and bottom edges of the inclined bottom wall 22 of hopper 12, the height of hoppers 12 and 14 may be substantially reduced and need not extend substantially beneath the plane of the truck body. Such reduction in height further reduces the weight of the construction, eliminates the need for bracing and prevents any interference which might exist when the truck body is fully inclined due to the construction striking the ground. This is particularly important where the truck body is one which has excessive overhang. These rigid side walls 52 or 52' of housing 14 or 14' substantially increase the strength of their housing and need not be attached other than by pivot rod 58 to the housing 12. Thus, the double benefit is realized of both added strength and ease and speed of mounting and removal of the hopper 14 or 14' to and from the hopper 12 or 12'. Indeed, the hopper 14 or 14' and its auger tube 16 may be quickly and readily removed from the hopper 12 or 12' and the latter hopper may be left in place for operations not requiring the auger tube. Provision of the rigid side walls 52 or 52' on hoppers 14 or 14' also render these walls impervious to wear and tearing in use and, thereby, improve the durability of the constructions of the present invention.

Provision of the flap 88 or the enlarged top wall 48' on housing 14' reduces the possibility of spillage, and the wall 48' further strengthens housing 14' and provides protection against the entry of foreign materials into hopper 12' during transit.

It will be understood that the embodiments of the present invention which have been described are merely illustrative of a few of the applications of the principles of the invention. Numerous modifications may be made by those skilled in the art without departing from the true spirit and scope of the invention.

What I claim is:

1. An auger-hopper construction for mounting to an inclinable body of a truck to receive material from the truck comprising:
    first hopper means, said first hopper means having an opening adjacent the bottom thereof,
    first hopper mounting means for mounting said first hopper means to the truck in a position to receive the material from the truck and such that no portion of said first hopper means extend substantially beneath a plane defined by the bottom of the inclinable body of the truck,
    second hopper means having an opening therein,
    pivotal mounting means for pivotally mounting said second hopper means to said first hopper means to receive material from said opening in said first hopper means, said pivotal mounting means permitting said second hopper means to pivot about an axis between upper and lower pivot limits, said pivotal mounting means mounting said second hopper means to said first hopper means such that the lowest portion of said second hopper means when pivoted to extend horizontally does not extend substantially beneath the plane defined by the bottom of the inclinable body of the truck when both hopper means are mounted to the truck,
    auger tube means,
    swivel mounting means mounting one end of said auger tube means to said second hopper means and overlying the opening therein to receive material from said latter opening,
    said pivotal mounting means and swivel mounting means cooperating to permit inclination of said auger tube means in plane substantially perpendicular to the axis of the pivotal movement and also in inclination in a plane substantially parallel to the axis of the pivotal movement at substantially all angles of inclination of the truck body.

2. The auger-hopper construction of claim 1, wherein said first hopper means includes a rear wall, and said pivotal mounting means is positioned such that said axis of pivotal movement is located intermediate between said rear wall of said first hopper means and the side of said first hopper means opposite said rear wall.

3. The auger-hopper construction of claim 2, wherein said first hopper means includes a bottom wall which is inclined and having upper and lower edges, and said axis of pivotal movement is located above said lower edge and intermediate said edges.

4. The auger-hopper construction of claim 3, wherein said axis is located substantially equidistant between at least one of said rear wall and said opposite side of said first hopper means and said upper and lower edges of said bottom wall.

5. The auger-hopper construction of claim 1, wherein said second hopper means includes an inclined bottom wall, said bottom wall extending at least to a location adjacent said axis of pivotal movement when said second hopper means is moved to between said pivot limits.

6. The auger hopper construction of claim 1, wherein both said hopper means include bottom walls, both of said bottom walls being inclined in the same direction as each other.

7. The auger-hopper construction of claim 1, wherein first hopper means includes a rear wall and said second hopper means includes a wall, said rear wall of said first hopper means and said wall of said second hopper means coincide with each other when said second hopper means is pivoted to said upper pivot limit.

8. The auger-hopper construction of claim 1 wherein said first hopper means includes a rear wall and a bottom wall inclined relative to said rear wall, and said opening in said first hopper means is defined by said rear wall and said bottom wall.

9. The auger-hopper construction of claim 1, wherein said first hopper means includes side walls and guide means extending outwardly from said side walls of said first hopper means to guide material from the tailgate to said first hopper means.

10. The auger-hopper construction of claim 9, wherein said guide means are formed of a flexible material.

11. The auger-hopper construction of claim 1 including selectively adjustable throttling means on said first hopper means for adjusting the flow of material from said opening of said first hopper means into said second hopper means.

12. The auger-hopper construction of claim 1 wherein said pivotal mounting means is removable to allow removal of said second hopper means from said first hopper means.

13. The auger-hopper construction of claim 1, wherein said first and second hopper means include rigid rear and side walls, said side walls of said second hopper means extending from its said rear wall toward said first hopper means, the maximum width of said rear wall of said second hopper means being at least as great as the maximum width of the rear wall of said first hopper means wherein said first hopper means is nestable in said second hopper means.

14. The auger-hopper construction of claim 13, wherein said first hopper means includes a bottom wall, and said pivotal mounting means comprises a pin extending through at least one side wall of said second hopper means, and pin receiving means fixed to the underside of said bottom wall of said first hopper means.

15. The auger-hopper construction of claim 4, wherein said first and second hopper means each include a rear wall and an inclined bottom wall, the bottom wall of said second hopper means being inclined relative to said rear wall and extending at least to a location adjacent said axis of pivotal movement when said second hopper means is moved between said pivot limits, said bottom wall of said second hopper means being inclined relative to said rear wall of said second hopper means and in the same direction as the angle of inclination of said bottom wall of said first hopper means to its said rear wall, said rear walls of said first and second hopper means coincide with each other when said second hopper means is pivoted to said vertical pivot limit, said opening in said first hopper means is in its said rear wall and is defined by said rear wall and said bottom wall of said first hopper means, said first and second hopper means also including rigid side walls, guide means extending outwardly from said side walls of said first hopper means to guide material from the tailgate to said first hopper means, said side walls of said second hopper means extending from its said rear wall toward said first hopper means wherein said first hopper means is nestable in said second hopper means.

16. The auger-hopper construction of claim 15 wherein said guide means is formed of a flexible material.

17. The auger-hopper construction of claim 15 including selectively adjustable throttling means on said first hopper means for adjusting the flow of material from said opening of said rear wall of said first hopper means into said second hopper means.

18. The auger-hopper construction of claim 15 wherein said pivotal mounting means is removable to allow removal of said second hopper means from said first hopper means.

19. The auger-hopper construction of claim 18 wherein said pivotal mounting means comprises a pin extending through at least one side wall of said second hopper means and pin receiving means fixed to the underside of said bottom wall of said first hopper means.

20. The auger-hopper construction of claim 1 wherein said first hopper mounting means mounts said first hopper means in stationary, but removable relationship to the truck.

21. The auger-hopper construction of claim 15 wherein said first hopper mounting means mounts said first hopper means in stationary, but removable relationship to the truck.

22. The auger-hopper construction of claim 1 including locking means to lock said first hopper means and second hopper means together when said second hopper means is at its upper pivot limit.

23. The auger-hopper construction of claim 15 including locking means to lock said first hopper means and second hopper means together when said second hopper means is at its upper pivot limit.

24. The auger-hopper construction of claim 1 including support means for supporting said auger tube means in each of its said inclinations.

25. The auger-hopper construction of claim 15 including support means for supporting said auger tube means in each of its said inclinations.

26. The auger-hopper construction of claim 1 wherein said pivotal and swivel mounting means permit inclination of said auger tube means in an arc of at least approximately 90° in said plane substantially perpendicular to the axis of the pivotal movement and in an arc of at least approximately 180° in said plane substantially parallel to the axis of the pivotal movement.

27. The auger-hopper construction of claim 15 wherein said pivotal and swivel mounting means permit inclination of said auger tube means in an arc of at least approximately 90° in said plane substantially perpendicular to the axis of the pivotal movement and in an arc of at least approximately 180° in said plane substantially parallel to the axis of the pivotal movement.

28. The auger-hopper construction of claim 1 wherein said second hopper means includes reinforcing flange means adjacent its top.

29. The auger-hopper construction of claim 28 wherein said flange means extends toward and overlies said first hopper means when said second hopper means is moved to said upper pivot limit.

30. The auger-hopper construction of claim 1 wherein said second hopper includes a rear wall, side walls and a top wall all joined to each other to define an enclosure to prevent spillage of material from said second hopper means.

31. The auger-hopper construction of claim 30 wherein said top wall overlies said first hopper means when said second hopper means is moved to said upper pivot limit.

32. The auger-hopper construction of claim 1 wherein said first hopper means is nested in said second hopper means when the latter is pivoted to its upper pivot limit.

33. The auger-hopper construction of claim 32, wherein said first hopper means includes a bottom wall, and said pivotal mounting means comprises a pin extending through at least one side wall of said second hopper means, and pin receiving means fixed to the underside of said bottom wall of said first hopper means.

34. The auger-hopper construction of claim 33, wherein said first hopper means bottom wall is inclined and includes upper and lower edges, and said pin receiving means is located above said lower edge and intermediate said edges.

35. The auger-hopper construction of claim 32 wherein said pivotal mounting means is removable to allow removal of said second hopper means from said first hopper means.

36. The auger-hopper construction of claim 32 wherein said first hopper mounting means mounts said first hopper means in stationary, but removable relationship to the truck.

37. The auger-hopper construction of claim 32 including locking means to lock said first hopper means and second hopper means together when said second hopper means is at its upper pivot limit.

38. The auger-hopper construction of claim 32 wherein said pivotal and swivel mounting means permit inclination of said auger tube means in an arc of at least approximately 90° in said plane substantially perpendicular to the axis of the pivotal movement and in an arc of at least approximately 180° in said plane substantially parallel to the axis of the pivotal movement.

39. The auger-hopper construction of claim 32 wherein said second hopper includes a top wall, and said rear wall, side walls and top wall of said second hopper means are all joined to each other to define an enclosure to prevent spillage of material from said second hopper means.

40. The auger-hopper construction of claim 39 wherein said top wall overlies said first hopper means when said second hopper means is moved to said vertical position.

41. The auger-hopper construction of claim 32 wherein said first and second hopper means each include an inclined bottom wall, the bottom wall of said second hopper means being inclined relative to said rear wall and extending at least to a location adjacent said axis of pivotal movement when said second hopper means is moved between said pivot limits, said bottom wall of said second hopper means being inclined relative to said rear wall of said second hopper means and in the same direction as the angle of inclination of said bottom wall of said first hopper means to its said rear wall, said rear walls of said first and second hopper means coincide with each other when said second hopper means is pivoted to its upper pivot limit, and said opening in said first hopper means is defined by said rear wall and said bottom wall of said first hopper means.

42. The auger-hopper construction of claim 41, including guide means formed of flexible material extending outwardly from said side walls of said first hopper means to guide material from the tailgate to said first hopper means.

43. The auger-hopper construction of claim 1, wherein when said second hopper means is pivoted about said axis between said upper and lower pivot limits it extends substantially vertically and horizontally, respectively, when the truck body is not inclined.

44. The auger-hopper construction of claim 1 including, in combination therewith, said inclinable truck body, said truck body including a tailgate having an opening therein to discharge the materials from said truck body, and said first hopper mounting means mounts said first hopper means adjacent said tailgate to receive the materials discharged from said tailgate opening.

45. The auger-hopper construction of claim 32, wherein when said second hopper means is pivoted about said axis between said upper and lower pivot limits it extends substantially vertically and horizontally, respectively, when the truck body is not inclined.

46. The auger-hopper construction of claim 32 including, in combination therewith, said inclinable truck body, said truck body including a tailgate having an opening therein to discharge the materials from said truck body, and said first hopper mounting means mounts said first hopper means adjacent said tailgate to receive the materials discharged from said tailgate opening.

* * * * *

UNITED STATES PATENT AND TRADEMARK OFFICE
CERTIFICATE OF CORRECTION

PATENT NO. : 4,411,581

DATED : October 25, 1983

INVENTOR(S) : D. Wayne Niewold

It is certified that error appears in the above-identified patent and that said Letters Patent are hereby corrected as shown below:

Column 2, line 11 - delete "bracking" and insert --bracing--.

Signed and Sealed this

Seventeenth Day of January 1984

[SEAL]

Attest:

GERALD J. MOSSINGHOFF

Attesting Officer

Commissioner of Patents and Trademarks